United States Patent [19]

Mashimo et al.

[11] 4,090,207
[45] May 16, 1978

[54] PHOTOGRAPHIC INFORMATION INDICATION DEVICE

[75] Inventors: Yukio Mashimo, Tokyo; Tadashi Ito, Yokohama, both of Japan

[73] Assignee: Canon Kabushiki Kaisha, Tokyo, Japan

[21] Appl. No.: 618,111

[22] Filed: Sep. 30, 1975

[30] Foreign Application Priority Data

Oct. 4, 1974 Japan .................. 49-114366

[51] Int. Cl.² .................. G03B 7/08; G03B 17/20
[52] U.S. Cl. .................. 354/23 D; 354/38; 354/53; 354/60 L
[58] Field of Search .......... 354/23 D, 38, 53, 60 L, 354/26, 29, 30, 57

[56] References Cited

U.S. PATENT DOCUMENTS

| 3,212,418 | 10/1965 | Kuppenbender | 354/53 X |
|---|---|---|---|
| 3,713,369 | 1/1973 | Fujii | 354/23 D |
| 3,868,704 | 2/1975 | Yamoda et al. | 354/23 D X |
| 3,872,483 | 3/1975 | Numata et al. | 354/23 D X |
| 3,876,876 | 4/1975 | Kitai et al. | 354/53 X |
| 3,889,278 | 6/1975 | Takahata et al. | 354/60 L X |
| 3,899,789 | 8/1975 | Taguchi et al. | 354/30 |
| 3,909,137 | 9/1975 | Kisanuki | 354/60 L X |
| 3,928,858 | 12/1975 | Sakurada et al. | 354/23 D |
| 3,964,073 | 6/1976 | Kobori et al. | 354/29 |
| 3,982,254 | 9/1976 | Ito et al. | 354/53 |

FOREIGN PATENT DOCUMENTS 2,405,705  7/1974  Germany ............ 354/23 D

Primary Examiner—Donald A. Griffin
Assistant Examiner—William B. Perkey
Attorney, Agent, or Firm—Toren, McGeady and Stanger

[57] ABSTRACT

In a camera which permits both shutter-preference and aperture-preference automatic operation, the selected shutter time is displayed digitally within a view finder while the selected aperture appears as an analog value.

8 Claims, 8 Drawing Figures

PHOTOGRAPHIC INFORMATION INDICATION DEVICE

BACKGROUND OF THE INVENTION:

1. Field of the Invention:

The present invention relates to an indication device of photographing information of a camera, particularly relates to an indication device for shutter time and diaphragm aperture.

2. Description of the Prior Art:

As a convenience for photographers, view finders of cameras often display various types of photographic data. If the diaphragm aperture is displayed, the photographer can readily estimate the depth of field. If the shutter time is displayed, the photographer can easily determine whether moving objects can be photographed. Therefore, cameras having information indicating view finders are widely used.

Many types of single-preference automatic exposure control (AE) cameras are available. In the shutter preference type, the shutter speed is selected and the diaphragm is automatically set to conform to the shutter speed. Conversely, in the diaphragm preference types, the diaphragm is selected while the shutter speed is automatically adjusted thereto. Double preference cameras in which either the shutter speed or the diaphragm may be set while the other is automatically adjusted thereto, have been proposed. Such cameras can utilize a conventional method of mechanically indicating the preset values of shutter time or diaphragm aperture with an indication member. They can display both automatically adjusted values with the same meter movement by mechanically switching between a shutter scale and a diaphragm scale. Such conventional devices are somewhat confusing and inconvenient for a photographer when the preference mode is switched. The system is also mechanically complicated and adds weight to lightweight cameras. One proposal for eliminating these shortcomings involves the use of a seven segment LED indicator for digitally indicating the preset value and the automatically adjusted value. However, the digitally indicated shutter time follows a primary geometrical progression such as 8, 4, 2, 1, $\frac{1}{2}$, $\frac{1}{4}$, ... When intermediate values are indicated they can be appreciated intuitively. Diaphragm values follow a secondary geometrical progression such as 1, 1.4, 2, 2.8, 4, 5.6 ... Even if intermediate values are indicated, their effect is more difficult to appreciate.

In this case, since the shutter time digitally indicated is such primary geometrical progression series as 8, 4, 2, 1, $\frac{1}{2}$, $\frac{1}{4}$, when intermediate values therefor are indicated, they will be apprehended intuitively, but as the diaphragm values are such secondary geometrical progression series as 1, 1.4, 2, 2.8, 4, 5.6 . . . . . , even if the intermediate values therefor are indicated, they will be hard to be apprehended. From the above, it will be understood that digital indication is convenient for shutter time but not suitable for diaphragm value indication.

SUMMARY OF THE INVENTION

According to a feature of the present invention photographic information is displayed in an indication device of an automatic exposure camera which permits manually selecting the shutter time and diaphragm aperture by displaying the selected shutter time with digital indication means and the selected diaphragm aperture is indicated with analog indication means.

According to another feature of the present invention a photographing information indication device is provided for a camera which manually selects either shutter time or diaphragm aperture beforehand and makes a computation based on the preset value and light measured value for an automatic exposure, wherein the shutter time, either preset or selected as a result of computation, is indicated by digital indication means, while the diaphragm aperture either, preset or selected as a result of computation, is indicated by an analog indication means.

According to another feature of the present invention a photographing information indication device is provided for an alternate-preference camera, in which a photographer can switch freely between a shutter time preference operation and a diaphragm aperture preference operation, by arranging the indications for the preference shown within a finder so that shutter time indication is displayed digitally while diaphragm aperture indication is an analog display, and so that even if the above mentioned preference photographing system is switched over the positions of the indications will not be changed.

DESCRIPTION OF PREFERRED EMBODIMENTS

Figure 1:
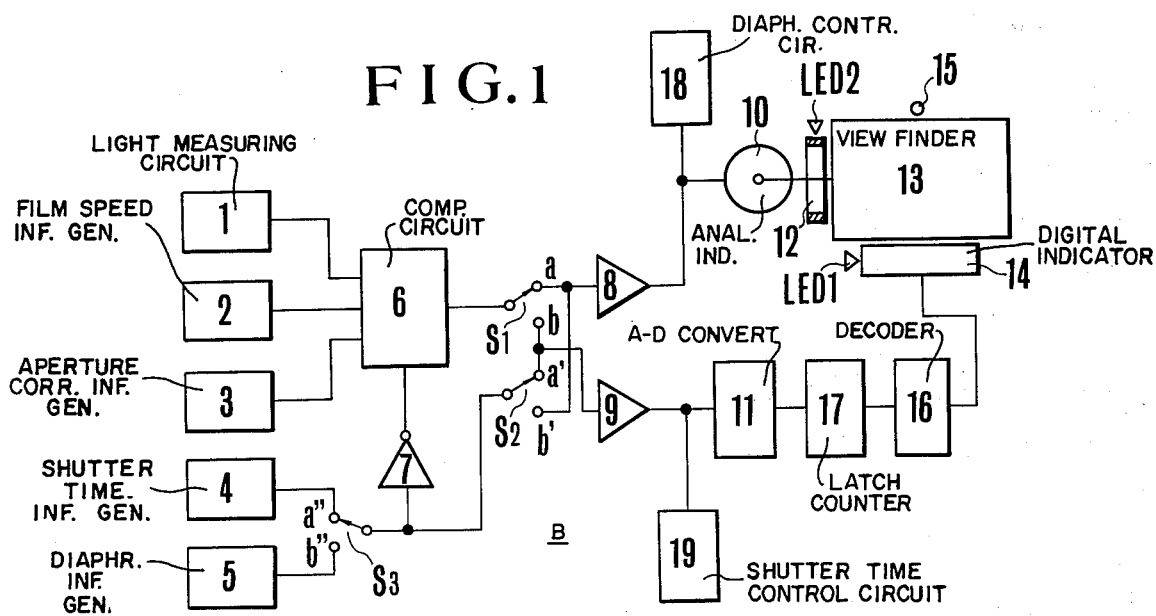
FIG. 1 is a circuit system diagram for an example of a photographing information indication device of the present invention.

FIG. 1 is a circuit system diagram illustrating one example of a photographic information indication device according to the present invention. Here a light measuring circuit 1 senses the brightness of an object. In a TTL system, the circuit 1 contains a memory circuit for memorizing the measured light value. Circuit 2 is a film speed information generator. An aperture-correction information generator 3 supplies a value Avo to conform the amount of light measured to the maximum aperture ratio of the lens, and also furnishes a value Avc to make corrections so that the shifting in diaphragm aperture will become proportionate with the shifting of the amount of light received near aperture of diaphragm, at the time of TTL fully opened aperture light measuring. Circuit 4 is a shutter time information generator. Circuit 5 is a diaphragm aperture information generator. 6 is a computation circuit. Circuit 7 is a phase inverter. Member 8 and 9 are buffer amplifier. An analog indicator 10 is in the form of a meter, etc. Circuit 11 is an analog-digital converter. Circuit 12 is a diaphragm aperture value calibration scale plate . Circuit 13 is a view finder. A digital indicater 14 is composed of a 7-segment LED, etc. Member 15 is an LED for charging completion indication for a stroboscope or for battery checking. Circuit 16 is a decoder. Circuit 17 is a latch counter, and 18 is a diaphragm control circuit. Circuit 19 is a shutter time control circuit. Switches $S_1$, $S_2$, $S_3$ select the shutter preference mode when set at contact $a$, $a'$, $a''$ and select the diaphragm preference mode when set a contacts $b$, $b'$, $b''$.

For shutter preference operation, a diaphragm ring is set at the auto position while the desired time is set at a shutter dial. This sets switches, $S_1$, $S_2$, $S_3$ so they are connected to contacts $a$, $a'$, $a''$ as shown in A separate preference selection switch may also be used to select the preference mode.

In the setting shown a first step in the stroke of a shutter release button, turns on a power source switch (not shown in the drawing) and starts the light measuring process. The value, $Bv - Avo - Avc$ appears at the light measuring circuit 1, and Sv appears at the film speed generator to 2, while the value $Avc + Avo$ appears at the aperture correction generator 3. Preset shutter time information Tv appears at the output of the generator 4. An inverter 7 renders Tv negative and applies it to computation circuit 6. These values are all applied to a computer 6 to conduct apex computation and diaphragm aperture information Av is produced at the output of 6 following the equation (1) shown below:

$$(Bv - Avc - Avo) + Avc + Avo + Sv - Tv = Av \quad (1)$$

Said Av is indicated as an analog value on a diaphragm calibration scale plate 12 by a meter 10 through the switch $S_1$ and the buffer 8. The preset value Tv is applied to the AD converter 11 through the switch $S_2$ and the buffer 9 and is converted to digital information. It then is displayed at the digital indicator 14 offer passing through the latch counter 17 and the decoder 16 next, when diaphragm aperture control is of balance type, at the second step stroke of shutter button, the diaphragm preset pin is set at a position corresponding to Av, which is a computation result of 6, and the diaphragm blades are stopped down to this position. At the same time a mirror ascends and a leader screen starts to initiate exposure. After an elapse of a period of time corresponding to the set value Tv, a follower screen is run by the control circuit 19 to complete exposure.

For diaphragm preference photographing, a shutter dial is set at auto and any desired diaphragm aperture value is set by a diaphragm ring. Thus switches $S_1$, $S_2$, $S_3$ are all changed to contact $b$ $b'$ and $b''$. Also as mentioned above setting of diaphragm preference, shutter preference, and manual, etc. may be made by a separate selector switch.

In this state, similar to the case of the above mentioned shutter preference, the computation of $(Bv - Avc - Avo) + Avc + Avo + Sv - Av = Tv$ is performed at the computor 6 by the first step stroke of the shutter button, and shutter time information Tv is produdced at 6. Therefore, the preset diaphragm aperture value is analogically indicated by the meter 10, and the result of computation, Tv is AD converted and decoded, then the value thereof is indicated by the digital indicator 14.

Figure 2:
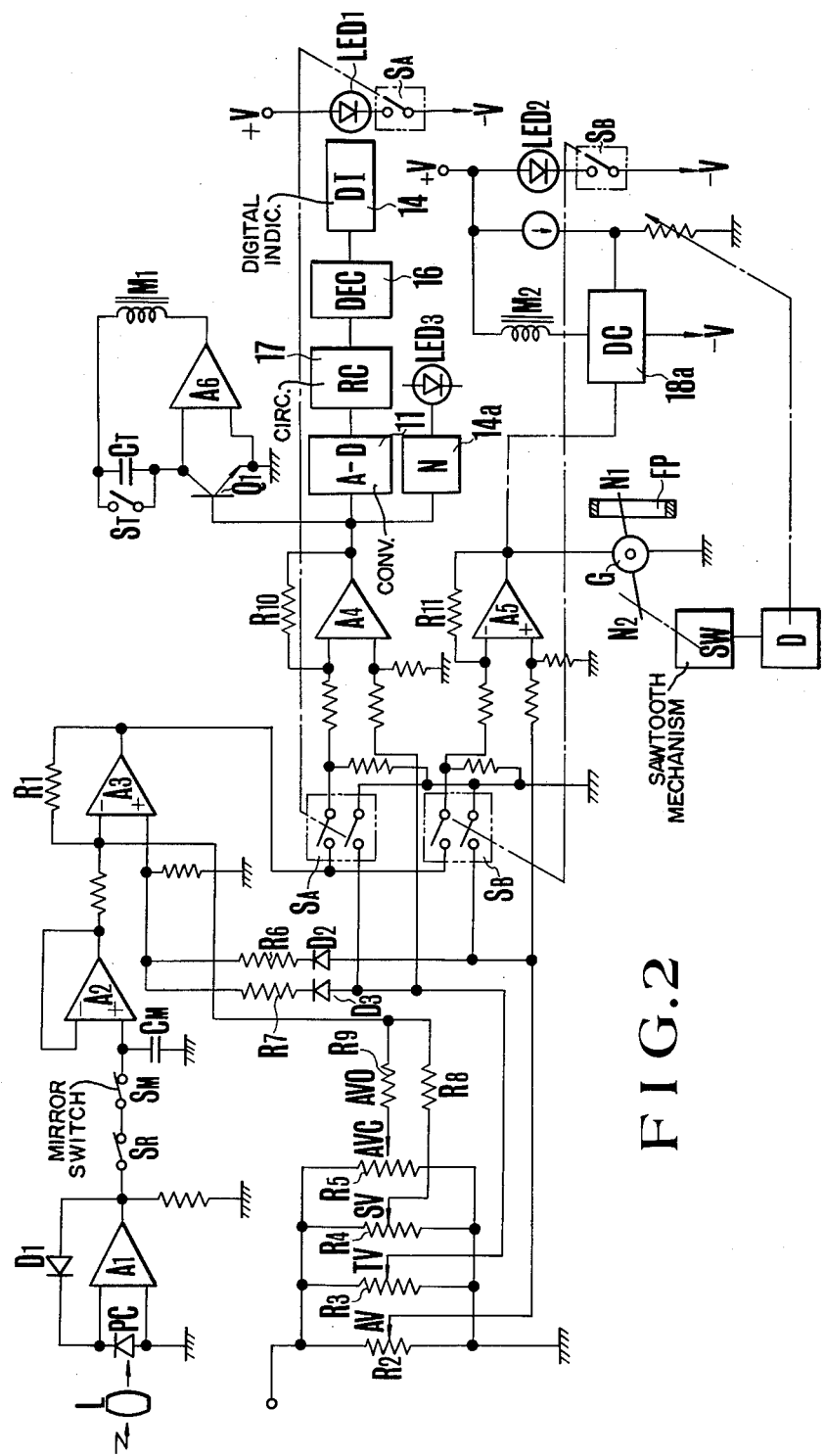
FIG. 2 is a circuit connection diagram used when another example of a photographing information indication device of the present invention is applied to a single lens reflex camera.

FIG. 2 is a circuit connection diagram to show details when another example of a photographic information indication device according to the present invention is applied to a single lens reflex camera. In the drawing, a light receiving element PC employs for example, a silicon photo-cell, to receive light beam from an object through a taking lens L. The element PC is located at a position almost equivalent to a film surface. A computation amplifier $A_1$ for a light measuring circuit and a log diode $D_1$ is inserted in the feedback path thereof to conduct logarithmic compression. Switch $S_R$ serves for EE locking, switch $S_M$ is a memory switch, and capacitor $C_M$ is a memory capacitor. Switch $S_M$ is turned OFF as the mirror ascends to memorize the value of light measured before the mirror is activated at $C_M$.

An amplifier $A_2$ exhibits a high input impedance (voltage borrower), amplifier $A_3$ is a computation amplifier, and $R_1$ resistor is a feedback resistance. Variable resistors $R_2$, $R_3$, $R_4$ and $R_5$ are associated with a diaphragm ring, a shutter dial, an ASA dial, etc. to set each photographic data. Member $R_6$ to $R_9$ are series resistances and $D_2$, $D_3$ are diodes, and each information shown in the drawing is impressed to inversion and non-inversion input terminals of an amplifier $A_3$.

$S_A$ and $S_B$ are analog switches composed of semi-conductors such as FETS, etc., turn ON as control signal is applied. Member $A_4$ is a computation amplifier constituting a buffer of a time control circuit, and $A_5$ is a computation amplifier of a diaphragm control circuit, while $R_{10}$, $R_{11}$ are feedback resistances of $A_4$, $A_5$, respectively. Member 11 is an A-D converter to which the output of $A_4$ is impressed and 17 is a latch counter. 16 is a decoder and a digital indicator 14 indicates digitally numbers and symbols with the value code signal generated at the output of said decoder. The digital indicater 14 employs for example 7-segment illuminant diode indicater.

Figure 3A:
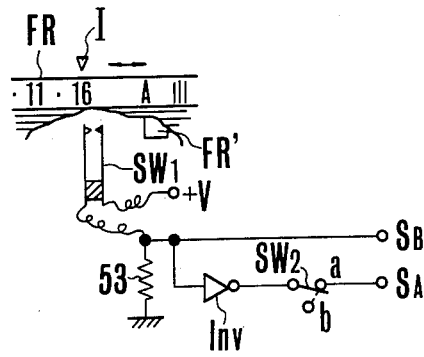
FIG. 3(a) is a set up diagram to show an example of a diaphragm aperture setting part.

Transistor $Q_1$ performs logarithmic elongation, and Capacitor $C_T$ is part of a time constant circuit. A switch $S_T$ turns OFF as a leader screen starts running. Member $A_6$ is a switching circuit and member $M_1$ is a magnet for a follower screen control. The output of $A_5$ flows to a meter G and a pointer $N_1$ indicates diaphragm aperture on a diaphragm aperture calibration scale plate FP with analog indications, while a pointer $N_2$ controls a sawtooth mechanism SW for diaphragm control. FIG. 3(a) is a set-up diagram to show an example of a diaphragm aperture setting part, wherein FR is a diaphragm ring positioned on a lens barrel, and I is an indication mark. Character "A" is an auto mark, FR' is a projection fixed at a diaphragm ring, and $SW_1$ is a contact. As $SW_1$ turns ON the signal of "1" is sent to the analogical switch $S_B$ of FIG. 2, while signal of "0" is sent to $S_A$. The switch $SW_2$ is turned ON ordinarily and turned OFF for manual-operation.

Figure 3B:
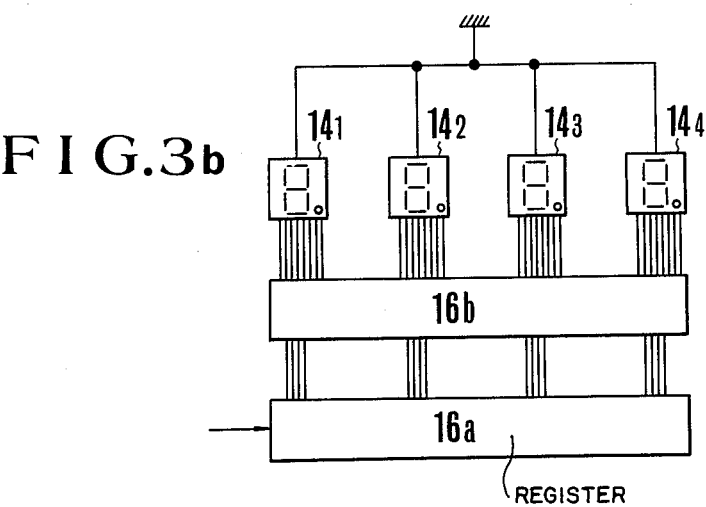
FIG. 3(b) is a circuit arrangement diagram to show an example of a digital indicater.

FIG. 3(b) is a circuit set up diagram to show an example of a digital indicator, of static drive type. In this drawing, a register 16a serves to memorize the digital information and reproduce the same in binary code. Member 16b emits the signal for activating an indication element, and applied the output signal from the register. Segment indication elements $14_1$ to $14_4$ are composed of light emitting diodes, etc., able to indicate numerals 0 to 9 and other codes and a decimal point. Four of them are placed in parallel to indicate the maximum of 4 figures.

FIG. 2 and FIGS. 3(a),(b) operates as follows.

First in the case of shutter preference photographing any desired time is set by the shutter dial while the diaphragm ring is set at AUTO. Thus the switch $SW_1$ is pushed by a projection FR' and turns ON. At the first step stroke of a shutter button a power source switch (not shown in the drawing) becomes ON, and light beam penetrating through the lens L impinges on the light receiving element PC and output thereof is logarithmically compressed by amplifier $A_1$ diode $D_1$ and is memorized at the capacitor $C_M$ through the EE locking switch $SR_1$ and the memory switch $S_M$. This input causes the output of $A_2$ exhibit a value Bv — Avo — Avc which is applied into an inversion element of an adder $A_3$. Also, Sv, Avo + Avc are inputted from the preset resistance $R_4$, $R_5$. In FIG. 3 when the mark A is matched with an indication mark I, control signal is added to the analogical switch $S_B$, which turns ON. By this, the output of the adder $A_3$ is inputted into amplifier $A_5$ of the diaphragm control system while the signal of Av from the preset resistance $R_2$ is grounded. Members $D_2$, $D_3$ are reverse current prevention diodes, and the preset value of Tv is applied from $R_3$ through $R_7$ into non-inversion input terminal of the adder $A_3$. As a result, value Bv — Avo — Avc + Sv + Avc + Avo is applied to the inversion input terminal of the adder $A_3$, while Tv is inputted into non-inversion input terminal, therefore the computation result —Av of $$-\{(Bv - Avo - Avc) + Sv + Avo + Avc - Tv\} = -Av$$

is produced at the output terminal of amplifier $A_3$. This is transmitted to the inversion input terminal of $A_5$ through $S_B$ while Av is outputted at the output of amplifier $A_5$. The meter G will be swung to indicate appropriate diaphragm aperture value on the diaphragm calibration scale plate FP.

Also the preset Tv is digitallized by the AD converter 11, the latch counter 17, and the decoder 16 through amplifier $A_4$ and is indicated by values with the digital indicator 14. Then at the second stroke of shutter button, the memory switch $S_M$ turns OFF and after the mirror ascends and the diaphragm stopped down, the switch $S_T$ turns OFF as the leader screen starts and $C_T$ is charged with the output of the transistor $Q_1$.

Since the preset signal Tv arrives from $A_4$ into the input of transistor $Q_1$, the switching circuit $A_6$ is inversed with such time constant as determined by the output resistance of $C_T$ and $Q_1$, and the follower screen is run by $M_1$. Upon completion of follower screen running, the mirror and the diaphragm resume their original positions to complete the photographic operation.

For diaphragm-preference photography, $SW_1$ is turned OFF and the analog switch $S_A$ turns ON by the control signal therefrom while the $S_B$ turns OFF. This causes the value Av preset at $R_2$ to be applied to the (+) terminal of $A_3$ through $D_2$, $R_6$, contrary to the case of shutter preference. The computation, $$-\{(Bv - Avo - Avc) + Sv + Avo + Avc - Av\} = -Tv$$

is performed at $A_3$, and the output —Tv of $A_3$ is applied to $A_4$ through $S_A$ and is digitallized by 11, 17, 16 and digital value is indicated by 14. Also the preset Av is input directly into $A_5$ from $R_2$ and is analogically indicated by the meter G. And the shutter time control circuit consisting of $Q_1$, $S_T$, $A_6$, $M_1$ is activated with the output signal Tv of $A_4$. Thus proper exposure can be obtained. Diaphragm control is defined by a preset pin set by the diaphragm preset value, and is stopped down after the mirror-up. Also as shown by dotted line in the drawing, the diaphragm control circuit 18a may be controlled by the output of $A_5$ and the diaphragm mechanism may be activated by a magnet $M_2$.

As mentioned above, in the shutter-preference mode, when the switch $S_B$ is ON, the preset value Tv is digitally indicated by the indictor 14 and the computation result Av is shown as an analog value by the meter G. Also depending on the lens exchange system, the information of Av is given stepwise of Av — Avo. In this case Av — Avo is set at $R_2$ and at the computer $A_3$ the computation of $$-(Bv - Avo - Avc) + Avc + Sv - (Av - Avo) = -Tv$$

is performed to produce —Tv. At this time, since the output of $A_5$ is Av — Avo the calibration scale plate FP may be moved following Avo to satisfy (Av — Avo) + Avo = Av. The control of diaphragm is done with the step signal of Av — Avo.

For manual photographing, both switches $SW_1$, $SW_2$ are turned OFF. The switches $S_A$ and $S_B$ are simultaneously turned OFF. The values Tv and Av preset by $R_3$, $R_2$ are directly applied to $A_4$ and $A_5$ of the control circuit. Thus indication and control are performed in a similar manner as before.

Both of illuminant diodes $LED_1$ and $LED_2$ in FIG. 1 and FIG. 2 indicate each preference setting. In the case of diaphragm-preference $S_B$ turns ON and the $LED_2$ is lighted while in the case of shutter preference $S_A$ turns ON and the $LED_1$ is lighted. Outside limit warning of diaphragm is indicated by warning zone at both ends of the calibration scale plate FP. An operator is warned of operation outside the limit of shutter time by lighting $LED_3$ through a warning circuit 14a. Also it is possible to use $LED_2$ for additional purpose, that is it is ordinarily lighted for preference indication while it can be caused to flicker for warning.

Figure 4:
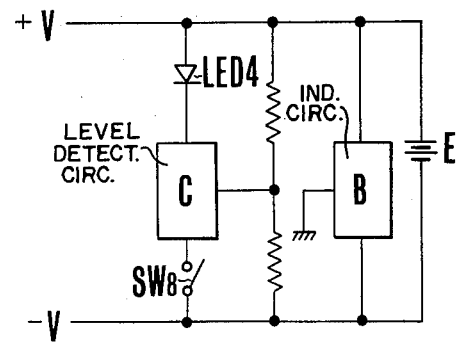
FIG. 4 is a battery check circuit.

Next, FIG. 4 shows a battery checking circuit. Here when the voltage of a power source E is at a prescribed value or higher as a check button $SW_8$ is pushed, $LED_4$ is lighted while it is put out when the voltage is below the same value. In the drawing C is a level detection circuit, B is an electric circuit of the device.

As has been mentioned above, in the indication system of a multi-preference camera according to the examples of the present invention, the shutter time which is suited for digital indication is always displayed by a digital indicater while the diaphragm value, for which is suitable for analog indication is always indicated analogically by a meter, etc.. The very advantageous indication can be done always at a fixed position within a finder in using a multi-preference auto exposure camera.

Figure 5A:
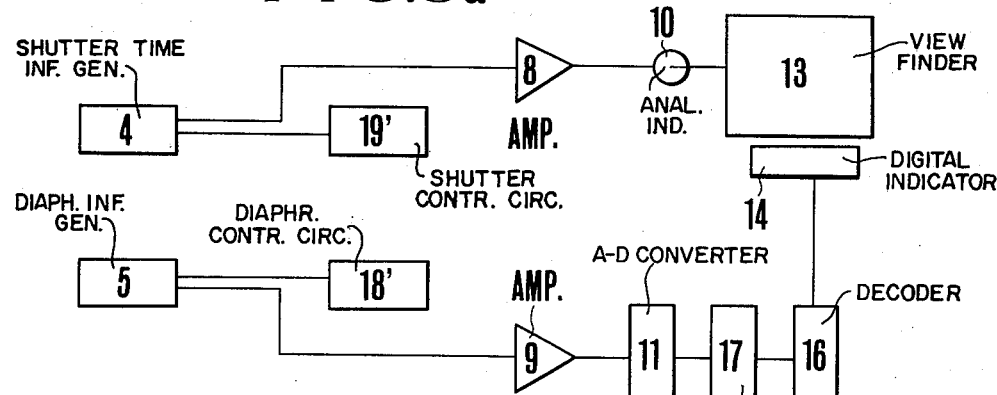
FIG. 5(a), (b), (c) are circuit system diagrams to show other examples of a photographing information indication device according to the present invention.
Figure 5B:
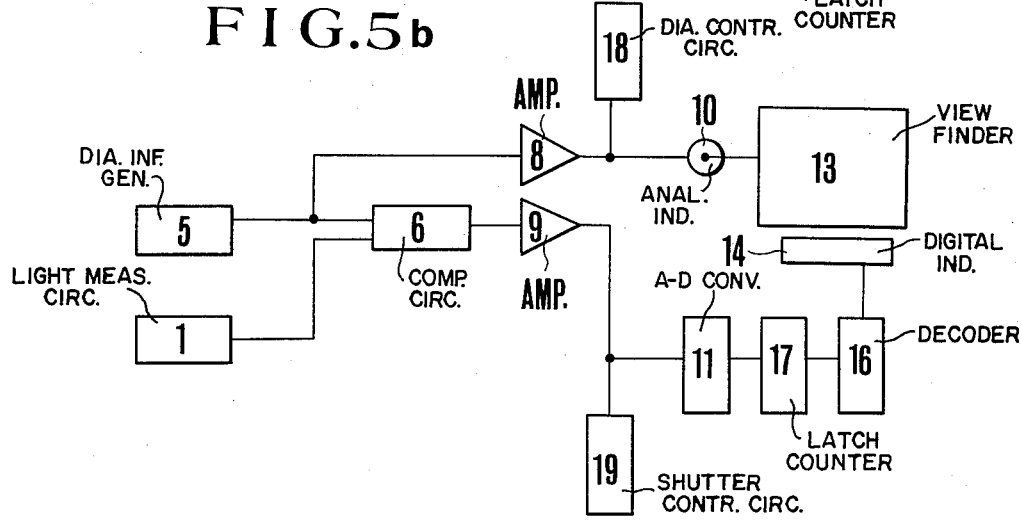
Figure 5C:
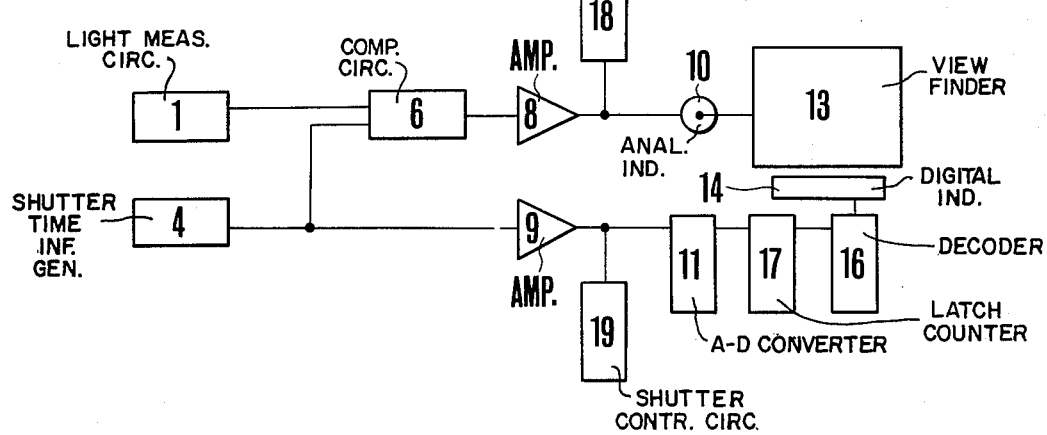

FIGS. 5(a), (b), (c) are circuit system diagrams to show other examples of a photographic information indication device according to the present invention, and are suited, respectively, for a camera without an automatic exposure mechanism, a camera having diaphragm-preference automatic exposure mechanism, and a camera having a shutter-time-preference type automatic exposure mechanism. In the same drawing, same components as shown in the above examples are identified with same numbers and symbols. Also, members 18', 19' are a diaphragm control mechanism and a shutter time control mechanism, respectively.

The function of the devices shown in FIGS. 5(a), (b), (c) is same as those in, respectively, manual photographing, diaphragm preference photographing, shutter time preference photographing of a both-preference type camera shown in FIG. 2.

As explained above the photographic information indication device according to the present invention can be applied conveniently to cameras of various photographic systems, in any one of which the shutter time is indicated digitally while diaphragm opening appears as an analog value.

What is claimed is:

1. A photographic information indication device for a camera with a diaphragm and a shutter and a view finder, comprising:
   (a) diaphragm setting means for manually setting the diaphragm;
   (b) diaphragm information generating means coupled to said diaphragm setting means to produce an electric signal corresponding to the set diaphragm;
   (c) shutter time setting means for manually setting the shutter;
   (d) shutter time information generating means coupled with said shutter time setting means to produce an electric signal corresponding to a set value of the shutter time;
   (e) light measuring circuit which produces an electric signal corresponding to the quantity of light coming from a photographic object,
   (f) photographic mode selecting means for selecting either a shutter time preference mode or a diaphragm preference mode in response to the operation of the diaphragm setting means,
   (g) a computation circuit coupled to the selecting means and the light measuring circuit for responding to the shutter time information generating means and the light measuring circuit and computing an appropriate diaphragm value when the shutter preference mode is selected, and for responding to the diaphragm information generating means and the light measuring circuit and computing an appropriate shutter time when the diaphragm preference mode is selected;
   (h) said selecting means alternately coupling one of said information generating means to said computation circuit;
   (i) analog indication means connected to the computation circuit and said diaphragm information generating means to indicate an analog value corresponding to the diaphragm information;
   (j) a digital indication means connected to the computation circuit and said shutter time information generating means to digitally indicate a value corresponding to the shutter time;
   (k) diaphragm controlling means coupled to the diaphragm information generating means and the computation circuit for operating in response to an output of the computation circuit in the shutter time preference mode and in response to the diaphragm setting means when the diaphragm preference mode is selected and
   (l) a shutter time controlling means coupled to the diaphragm information generating means and the computation circuit for operating in response to an output from the shutter time setting means in the shutter time preference mode and in response to an output of the computation circuit when the diaphragm preference mode is selected.

2. A device according to claim 1, wherein the diaphragm information generating means and the shutter time generating means are variable resistors respectively.

3. A device according to claim 1, wherein the analog indication means includes an indicating current meter.

4. A device according to claim 1, wherein said digital indication means includes an analog-to-digital converter which produces a digital signal output corresponding to an analog signal input; a counter which counts and stores the digital signal output derived from the analog-to-digital converter; a decoder which is connected to the counter to produce a display element driving signal output; and a digital display element which is connected to the decoder.

5. A device according to claim 1, wherein the display elements are disposed inside the view finder.

6. A device according to claim 1, wherein said light measuring circuit includes a circuit which produces an analog signal corresponding to the intensity of light coming from a photographic object, and a memory means for storing information corresponding to the intensity of said light.

7. A device according to claim 1, further including mode indicating means which indicates selection of either a shutter time preference mode or a diaphragm preference mode in response to the operation of the selecting means said mode indicating means being actuated in response to the photographic mode selecting means.

8. A device according to claim 1, wherein the switching means is an analog switch.

* * * * *